(No Model.)
R. A. SADDLER.
CALIPERS AND DIVIDERS.
No. 524,611. Patented Aug. 14, 1894.
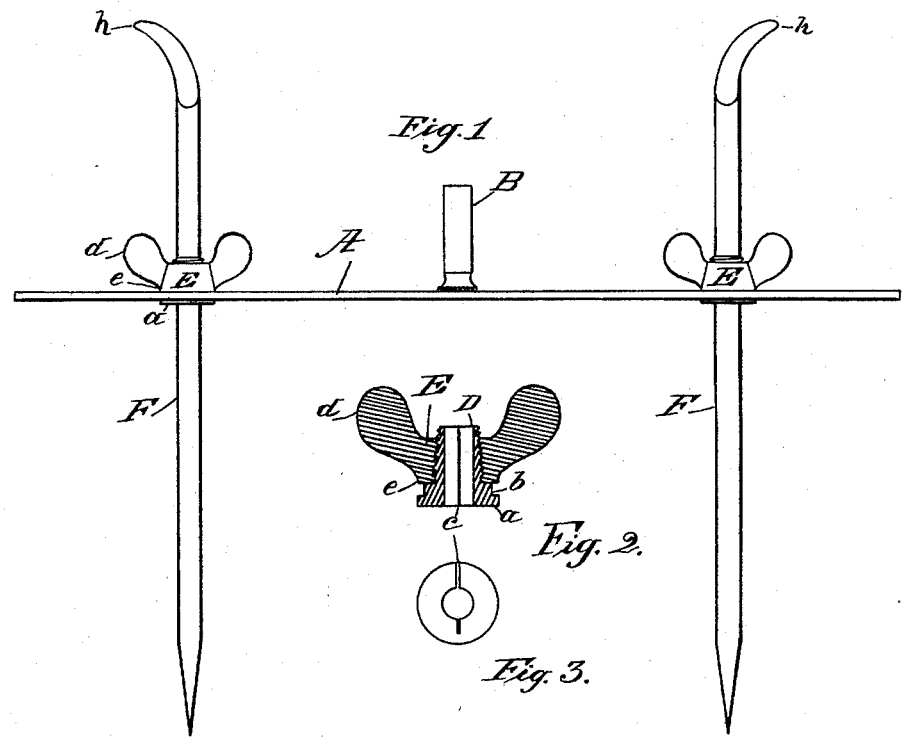
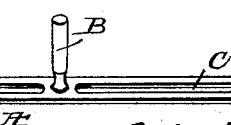
WITNESSES
INVENTOR
Robert A Saddler
By W. K. Miller
Attorney

UNITED STATES PATENT OFFICE.

ROBERT A. SADDLER, OF CANTON, OHIO, ASSIGNOR OF ONE-HALF TO WILLIAM BALSER, OF SAME PLACE.

CALIPERS AND DIVIDERS.

SPECIFICATION forming part of Letters Patent No. 524,611, dated August 14, 1894.

Application filed August 23, 1893. Serial No. 483,807. (No model.)

*To all whom it may concern:*

Be it known that I, ROBERT A. SADDLER, a citizen of the United States, and a resident of Canton, county of Stark, State of Ohio, have invented a new and useful Improvement in Dividers and Calipers, of which the following is a full, clear, and exact description, reference being had to the accompanying drawings, making part of this specification.

My invention relates to improvements in dividers and calipers, and consists in certain features of construction and combination of parts, as will be hereinafter described and pointed out in the claims.

Figure 1, of the accompanying drawings is a side elevation of a divider and caliper illustrating my invention. Fig. 2, is a transverse section through the tapering thumb nut and split sleeve. Fig. 3, is a plan view of the lower face of the split sleeve. Fig. 4 is a detail perspective view of the beam.

Similar letters of reference indicate corresponding parts in all of the figures of the drawings.

A represents the beam, having a centrally located handle B at each side of which is provided elongated apertures C and C'. To secure the divider legs to the beam, a tapering split sleeve as D is provided, having a flange portion $a$ to rest against the under side of the beam A, a hub portion $b$, the diameter of which corresponds with the width of the apertures C, C', in which the hub is adapted to slide. The body of the sleeve is tapered as shown in Fig. 2, and is provided with an annular screw thread, and is split longitudinally through the body as shown by the kerf $c$, Fig. 2, and through one side of the flange $a$ as shown in Fig. 3.

A thumb nut E is provided having wings $d$ and a tapering threaded aperture adapted to be turned onto the sleeve D, the aperture of the nut being somewhat smaller than the outside of the sleeve, when the nut is turned onto the sleeve, the sleeve will be thereby contracted to grasp the divider legs F, and at the same time the beam A is grasped between the flange $a$ and lower projecting portion $e$, of the nut, E, instantly securing the legs F against vertical or lateral movement.

The upper end portions $h$ of the legs F, are flattened and diverged from a line drawn longitudinally through the legs, the diverged or turned out points $h$ form a caliper for either inside or outside calipering. The lower ends of the legs are pointed as shown, and serve as dividers. The legs are parallel with each other and at right angles with the beam, when secured in working position.

If preferred the head H may be apertured and the leg F passed through to a point designated by the point of the leg at the opposite end of the beam.

Having thus fully described the nature and the object of my invention, what I claim, and desire to secure by Letters Patent, is—

1. In combination, the beam having elongated apertures, tapering screw-thread split sleeves each having a hub which fits the corresponding elongated aperture and a flange which takes under and abuts against the lower side of the beam, the divider legs extending through the split sleeves, and nuts on the screw-threaded portions of the sleeves adapted to tighten the sleeves on the legs and to the beam, substantially as herein described.

2. In combination, the beam having elongated apertures, tapering screw-threaded split sleeves each having a hub which fits the corresponding aperture and a flange which takes under and abuts against the lower side of the beam, legs embraced by said sleeves and having their lower portions pointed to serve as divider points and their upper ends turned from alignment with the legs to form a caliper, and nuts screwed on said tapering sleeves to tighten said sleeves upon the legs and the beam, substantially as herein described.

In testimony whereof I have hereunto set my hand this 21st day of August, A. D. 1893.

ROBERT A. SADDLER.

Witnesses:
W. K. MILLER,
BURT A. MILLER.